(12) United States Patent
Morkved et al.

(10) Patent No.: US 7,427,466 B2
(45) Date of Patent: Sep. 23, 2008

(54) ANTI-REFLECTION OPTICAL DATA STORAGE DISK MASTER

(75) Inventors: Terry L. Morkved, White Bear Lake, MN (US); Frank E. Aspen, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 501 days.

(21) Appl. No.: 10/999,611

(22) Filed: Nov. 29, 2004

(65) Prior Publication Data

US 2006/0115773 A1 Jun. 1, 2006

(51) Int. Cl.
*G11B 7/26* (2006.01)
(52) U.S. Cl. .................... 430/321; 430/320; 430/329
(58) Field of Classification Search .................. None
See application file for complete search history.

(56) References Cited

U.S. PATENT DOCUMENTS

| | | | |
|---|---|---|---|
| 3,565,978 A | | 2/1971 | Folger et al. |
| 4,150,398 A | | 4/1979 | Kojima et al. |
| 4,304,806 A | | 12/1981 | Anderson et al. |
| 4,308,337 A | | 12/1981 | Roach et al. |
| 4,374,077 A | | 2/1983 | Kerfeld |
| 4,519,065 A | | 5/1985 | Lewis et al. |
| 4,619,804 A | | 10/1986 | Leonard et al. |
| 4,650,735 A | | 3/1987 | De Laat |
| 4,724,043 A | * | 2/1988 | Bergendahl et al. ............ 216/2 |
| 5,096,563 A | | 3/1992 | Yoshizawa et al. |
| 5,149,607 A | | 9/1992 | De Graaf et al. |
| 5,325,353 A | | 6/1994 | Sasaki et al. |
| 5,381,394 A | | 1/1995 | Yanagawa |
| 5,436,885 A | | 7/1995 | Okumura et al. |
| 5,516,469 A | | 5/1996 | Santoh et al. |

(Continued)

FOREIGN PATENT DOCUMENTS

DE 41 40 712 A1 10/1992

(Continued)

OTHER PUBLICATIONS

F. Dill et al., "Characterization of Postive Photoresist," IEEE Transactions on Electron Devices, vol. ED-22, No. 7, Jul. 1975, pp. 445-452.
E. O. Keizer, "VideoDisc Mastering," RCA Review, vol. 39, No. 1, Mar. 1978, pp. 60-86.
P. Trefonas III et al., "New Principle for Image Enhancement in Single Layer Positive Photoresists," SPIE vol. 771, *Advances in Resist Technology and Processing IV*, Mar. 1987, pp. 194-210.
S. Nakamura et al., "High Density Recording for Magneto-optical Disk Drive," IEEE Transactions on Magnetics, vol. 34, No. 2, Mar. 1998, pp. 411-413.
A. Reiser, "Multilayer Techniques and Plasma Processing," Photoreactive Polymers The Science and Technology of Resists, Chapter 10, pp. 359-363, 1989.

*Primary Examiner*—Martin J. Angebranndt
*Assistant Examiner*—Anna L Verderame
(74) *Attorney, Agent, or Firm*—Eric D. Levinson (57) ABSTRACT

Mastering techniques are described that can improve the quality of a master used in data storage disk manufacturing. In particular, the techniques described herein can improve resolution of the features created on the master by reducing mastering noise. The techniques include depositing a multi-layer structure adjacent a master substrate layer. The multi-layer structure includes an etch stop layer, an etch layer, and a photoresist layer. A thickness of each of the layers is selected to generate substantially no reflectivity for at least one interface of the multi-layer structure to substantially eliminate stray light effects. The photoresist layer defines a portable conformable mask (PCM) for the etch layer. The etch layer is etched through the contact mask to define a feature of the master in the etch layer. The etch stop layer thickness may be selected to be as thin as possible to reduce surface roughness of the multi-layer structure.

14 Claims, 6 Drawing Sheets

U.S. PATENT DOCUMENTS

| | | | |
|---|---|---|---|
| 5,576,918 A | 11/1996 | Bar-Gadda et al. | |
| 5,581,539 A | 12/1996 | Horie et al. | |
| 5,626,941 A | 5/1997 | Ouano | |
| 5,635,267 A | 6/1997 | Yamada et al. | |
| 5,661,596 A * | 8/1997 | Biro et al. | 359/359 |
| 5,701,288 A | 12/1997 | Seong | |
| 5,723,033 A | 3/1998 | Weiss | |
| 5,739,972 A | 4/1998 | Smith et al. | |
| 5,751,510 A | 5/1998 | Smith et al. | |
| 5,763,037 A | 6/1998 | Ohtomo et al. | |
| 5,772,925 A * | 6/1998 | Watanabe et al. | 252/582 |
| 5,889,756 A | 3/1999 | Ichihara et al. | |
| 5,939,510 A * | 8/1999 | Sato et al. | 528/128 |
| 5,949,587 A | 9/1999 | Takamizawa et al. | |
| 6,183,829 B1 | 2/2001 | Daecher et al. | |
| 6,190,838 B1 | 2/2001 | Kerfeld | |
| 6,324,139 B1 | 11/2001 | Nakane | |
| 6,545,808 B1 * | 4/2003 | Ehbets et al. | 359/566 |
| 6,728,196 B2 | 4/2004 | Edwards | |
| 2003/0151814 A1 * | 8/2003 | Aspen | 359/498 |
| 2006/0051681 A1 * | 3/2006 | Taylor | 430/5 |

FOREIGN PATENT DOCUMENTS

| | | | |
|---|---|---|---|
| EP | 0 418 897 A2 | | 3/1991 |
| EP | 0 444 367 A1 | | 9/1991 |
| JP | 60-029950 | | 2/1985 |
| JP | 64-023440 | | 1/1989 |
| JP | 2-10536 | | 1/1990 |
| JP | 2-150325 | | 6/1990 |
| JP | 2-244440 | | 9/1990 |
| JP | 6-60441 | | 3/1994 |
| JP | 59-193560 | | 11/1994 |
| JP | 8-147768 | | 6/1996 |
| JP | 08-306080 | | 11/1996 |
| JP | 97097452 | | 4/1997 |
| JP | 97138981 | | 5/1997 |
| JP | 11133618 | * | 5/1999 |
| WO | WO 00/48172 | | 8/2000 |

* cited by examiner

ANTI-REFLECTION OPTICAL DATA STORAGE DISK MASTER

TECHNICAL FIELD

The invention relates to manufacturing techniques for creation of optical data storage disks.

BACKGROUND

Optical data storage disks have gained widespread acceptance for the storage, distribution and retrieval of large volumes of information. Optical data storage disks include, for example, audio CD (compact disc), CD-R (CD-recordable), CD-RW (CD-rewritable), CD-ROM (CD-read only memory), DVD (digital versatile disk or digital video disk), DVD-RAM (DVD-random access memory), and various other types of writable or rewriteable media, such as magneto-optical (MO) disks, phase change optical disks, and others. Some newer formats for optical data storage disks are progressing toward smaller disk sizes and increased data storage density. Many new formats boast improved track pitches and increased storage density using blue-wavelength lasers for data readout and/or data recording. A wide variety of optical data storage disk standards have been developed and other standards will continue to emerge.

Optical data storage disks are typically produced by first making a data storage disk master that has a surface pattern that represents encoded data on the master surface. The surface pattern, for instance, may be a collection of grooves or other features that define master pits and master lands, e.g., typically arranged in either a spiral or concentric manner. The master is typically not suitable as a mass replication surface with the master features defined within an etched photoresist layer formed over a master substrate.

After creating a suitable master, the master can be used to make a stamper, which is less fragile than the master. The stamper is typically formed of electroplated metal or a hard plastic material, and has a surface pattern that is the inverse of the surface pattern encoded on the master. An injection mold can use the stamper to fabricate large quantities of replica disks. Also, photopolymer processes can be used with stampers to fabricate replica disks. In any case, each replica disk may contain the data and tracking information that was originally encoded on the master surface. The replica disks can be coated with a reflective layer, a dye layer, and/or a phase change layer, and are often sealed with an additional protective layer. Other media formats, such as magnetic disk formats, may also use similar mastering and stamping techniques, e.g., to create media having small surface features which correspond to magnetic domains.

In some cases, the surface pattern encoded on the data storage disk master represents an inverse of the desired replica disk pattern. In those cases, the master is typically used to create a first-generation stamper, which is in turn used to create a second-generation stamper. The second-generation stamper, then, can be used to create replica disks that contain an inverse of the surface pattern encoded on the master. Creating multiple generations of stampers can also allow for improved replica disk productivity from a single data storage disk master.

The mastering process is one of the most critical stages of the data storage disk manufacturing process. In particular, the mastering process defines the surface pattern to be created in replica disks. The master will pass on any variations or irregularities to stampers and replica disks, and therefore, the creation of a high quality master is important to the creation of high quality replica disks. For this reason, it is highly desirable to improve mastering techniques.

The mastering process commonly uses a photolithographic process to define the master surface pattern. To facilitate the mastering process, an optically flat master substrate is coated with a layer of photoresist. A tightly focused laser beam passes over the photoresist-coated substrate to expose grooves or other latent features in the photoresist, which may be categorized as a direct-write photolithographic technique. The focused beam may also be modulated or wobbled to define information such as encoded data, tracking servos, or the like, within the features of the master disk. After exposing the photoresist, a developer solution removes either the exposed or unexposed photoresist, depending on whether a positive or negative photoresist material is used. In this development step, the latent exposure pattern is manifest as a topographical master pattern.

One source of mastering noise may be due to stray light caused by reflections of the incident laser light from the photoresist-coated substrate. The stray light may expose unwanted regions of the photoresist causing decreased sharpness and resolution of the mastered features during the development step. The master will then pass these noisy features on to stampers and replica disks.

SUMMARY

In general, the invention is directed to a mastering technique that can improve the quality of a master used in data storage disk manufacturing. In particular, the techniques described herein can improve resolution of the features created on the master by reducing mastering noise. The techniques include depositing a multi-layer structure adjacent a master substrate layer. The multi-layer structure includes an etch stop layer, an etch layer formed over the etch stop layer, and a photoresist layer formed over the etch layer. A thickness of each of the layers is selected to generate substantially no reflectivity for at least one interface of the multi-layer structure. In this way, mastering noise may be reduced by substantially eliminating stray light effects.

In some cases, the thicknesses are selected to generate a reflectivity of approximately zero at an interface of the photoresist layer and surrounding air such that the multi-layer structure has no reflectivity. In other cases, the thicknesses are selected to generate a reflectivity of approximately zero at an interface of the etch layer and the photoresist layer. In either case, the etch stop layer thickness may be selected to be as thin as possible while maintaining the anti-reflectivity of the multi-layer structure. In this way, a surface roughness of the master may also be reduced.

The photoresist layer may comprise a material capable of obtaining appropriate feature resolution and sharpness. The etch layer material may comprise appropriate etching properties. The etch stop layer may comprise a substantially etch resistant material. Furthermore, the etch stop layer may define an index of refraction greater than an index of refraction defined by the etch layer. The photoresist layer is illuminated with an exposing light and developed to define mastered features. The developed regions of the photoresist layer define a contact mask, or portable conformable mask (PCM), for the etch layer. The etch layer is then etched through the contact mask to define features of the master in the etch layer.

In some cases, the etch layer thickness may be selected to comprise a fixed thickness approximately equal to a final feature depth of the master. The thicknesses of the etch stop layer and of the photoresist layer may be chosen to generate a reflectivity of approximately zero at an interface of the multilayer structure. Therefore, substantially none of the exposing light incident on the photoresist layer is reflected from the multi-layer structure. In some cases, the etch stop layer thickness may be chosen to decrease surface roughness. The photoresist layer thickness may be chosen to increase feature resolution.

In one embodiment, the invention is directed to a data storage disk master comprising a substrate layer and a multi-layer structure deposited adjacent the substrate layer. The multi-layer structure includes an etch stop layer of a first thickness, an etch layer of a second thickness, and a photoresist layer of a third thickness. The first, second, and third thicknesses are selected to generate substantially no reflectivity for at least one interface of the multi-layer structure. The photoresist layer defines a contact mask and the etch layer is etched through the contact mask to define a feature of the master in the etch layer.

In another embodiment, the invention is directed to a method of creating a data storage disk master. The method comprises depositing a multi-layer structure adjacent a substrate layer; the multi-layer structure includes an etch stop layer of a first thickness, an etch layer of a second thickness formed over the etch stop layer, and a photoresist layer of a third thickness formed over the etch layer. The method further comprises, prior to depositing the multi-layer structure, selecting the first, second, and third thicknesses to generate substantially no reflectivity for at least one interface of the multi-layer structure. In addition, the method includes defining a contact mask with the photoresist layer, and etching the etch layer through the contact mask to define features in the etch layer.

The invention may be capable of providing one or more advantages. The described techniques can improve sharpness and resolution of the features created on the data storage disk master by decreasing noise during the mastering processes. For example, the multi-layer structure is designed to provide a reflectivity of approximately zero for at least one interface of the multi-layer structure. In this way, substantially no exposing light reflects out of the multi-layer structure, which substantially eliminates stray light exposure of the photoresist layer. In addition, the techniques can further reduce mastering noise by reducing a surface roughness of the master. For example, the etch stop layer thickness may be selected to be as thin as possible while maintaining the anti-reflection of the multi-layer structure. Reducing the thickness of the etch stop layer, in turn, reduces the surface roughness of the master.

The details of one or more embodiments of the invention are set forth in the accompanying drawings and the description below. Other features, objects, and advantages of the invention will be apparent from the description and drawings, and from the claims.

DETAILED DESCRIPTION

The invention is directed to a mastering technique that can improve the quality of a master used in data storage disk manufacturing. In particular, the techniques described herein can improve resolution of the features created on the master by reducing mastering noise. The techniques include depositing a multi-layer structure adjacent a master substrate layer. The multi-layer structure includes an etch stop layer, an etch layer formed over the etch stop layer, and a photoresist layer formed over the etch layer. A thickness of each of the layers is selected to generate substantially no reflectivity for at least one interface of the multi-layer structure. Specifically, the reflectivity at the interface of the photoresist layer and surrounding air, or the interface of the etch layer and the photoresist layer can be substantially minimized. In the case where reflectivity at the interface of the photoresist layer and surrounding air is made to be approximately zero, the total reflectivity of multi-layer structure can be said to be approximately zero. Furthermore, the etch stop layer may define an index of refraction greater than an index of refraction defined by the etch layer. In this way, mastering noise may be reduced by substantially eliminating stray light effects.

A number of embodiments of the invention are described in greater detail below. In one embodiment, the thicknesses are selected to generate a reflectivity of approximately zero at an interface of the photoresist layer and air. In another embodiment, the thicknesses are selected to generate a reflectivity of approximately zero at an interface of the etch layer and the photoresist layer. In either case, a thickness of the etch stop layer may be selected to generate the anti-reflectivity of the multi-layer structure and reduce a surface roughness of the master, which further reduces mastering noise.

The photoresist layer is illuminated with an exposing light and developed to define a contact mask, or portable conformable mask (PCM), for the etch layer. The etch stop layer may comprise an index of refraction higher than the etch layer. The thicknesses of the layers in the multi-layer structure are selected to generate a reflectivity of approximately zero at an interface of the multi-layer structure. Therefore, substantially none of the exposing light incident on the photoresist layer during the illumination process is reflected from the multi-layer structure. The etch layer is then etched through the contact mask to define a feature of the master in the etch layer. The thickness of the etch layer may also comprise a fixed thickness approximately equal to a final feature depth of the master.

Figure 1:
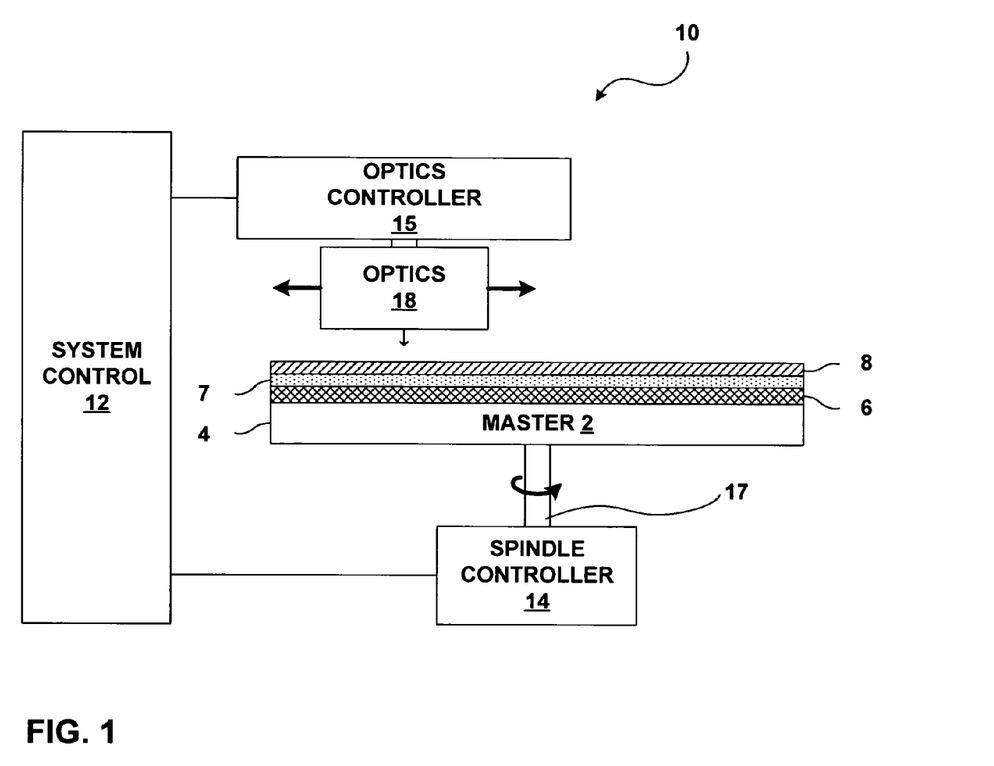
FIG. 1 is a block diagram illustrating an illumination system that may be used to photolithographically define regions of a master in accordance with embodiments of the invention.

FIG. 1 is a block diagram illustrating an illumination system 10 that may be used to photolithographically define regions of master 2 in accordance with embodiments of the invention. In general, illumination system 10 includes a system control 12, such as a personal computer, workstation, or other computer system. System control 12, for example, may comprise one or more processors that execute software to provide user control over system 10. System control 12 provides commands to spindle controller 14 and optics controller 15 in response to user input. The commands sent from system control 12 to spindle controller 14 and optics controller 15 define the operation of system 10 during the photolithography process.

Data storage disk master 2 (hereafter "master 2") may comprise a disk-shaped glass substrate 4 with a multi-layer structure, as described herein, deposited adjacent substrate 4. Substrate 4 may comprise other substrate materials of suitable optical surface quality as well as non-disk shapes. The multi-layer structure includes an etch stop layer 6, an etch layer 7, and a photoresist layer 8. Thicknesses of the layers are selected to generate a reflectivity of approximately zero for at least one interface of the multi-layer structure.

Master 2 is carefully placed in system 10 on spindle 17. Optics 18 may provide light that exposes photoresist layer 8, according to commands by system control 12, to define a portable conformable mask (PCM) for etch layer 7. In some embodiments, the PCM may be defined using tip recording with a focused laser spot. The tip recording process provides fine feature resolution in the master mask such that high resolution features may be defined in etch layer 7 through the PCM. The etch layer thickness may comprise a fixed thickness approximately equal to a final feature depth of the master. The etch stop layer may comprise an index of refraction higher than the etch layer. The thicknesses of all layers in the multi-layer structure are selected to generate a reflectivity of approximately zero at an interface of the multi-layer structure. Therefore, substantially none of the light incident on photoresist layer 8 is reflected from the multi-layer structure, which reduces stray light exposure of photoresist layer 8.

Spindle controller 14 causes spindle 17 to spin master disk 2, while optics controller 15 controls the positioning of optics 18 relative to master 2. Optics controller 15 also controls any on-off switching of light that is emitted from optics 18. As master 2 spins on spindle 17, optics controller 15 translates optics 18 to desired positions and causes optics 18 to emit light that exposes photoresist layer 8.

Photoresist layer 8 may comprise a deep-UV, mid-UV, or a violet photoresist material. The deep-UV photoresist material may comprise a material primarily sensitive to wavelengths of light less than 300 nm, the mid-UV photoresist material may comprise a material primarily sensitive to wavelengths of light between approximately 400 nanometers and 300 nanometers, and the violet photoresist material may comprise a material primarily sensitive to wavelengths of light between approximately 460 nanometers and 400 nanometers. As an example, photoresist layer 8 may comprise a Shipley S1805 positive photoresist material commercially available from the Rohm and Haas Company of Philadelphia, Pa.

The invention is generally described herein as comprising a positive photoresist for photoresist layer 8. However, either positive photoresist or negative photoresist may be used. In other words, the exposure of photoresist layer 8 can result in removal of the photoresist by a developer process, or the exposure can result in the creation of features with the non-exposed areas being removed by a developer process.

Figure 2:
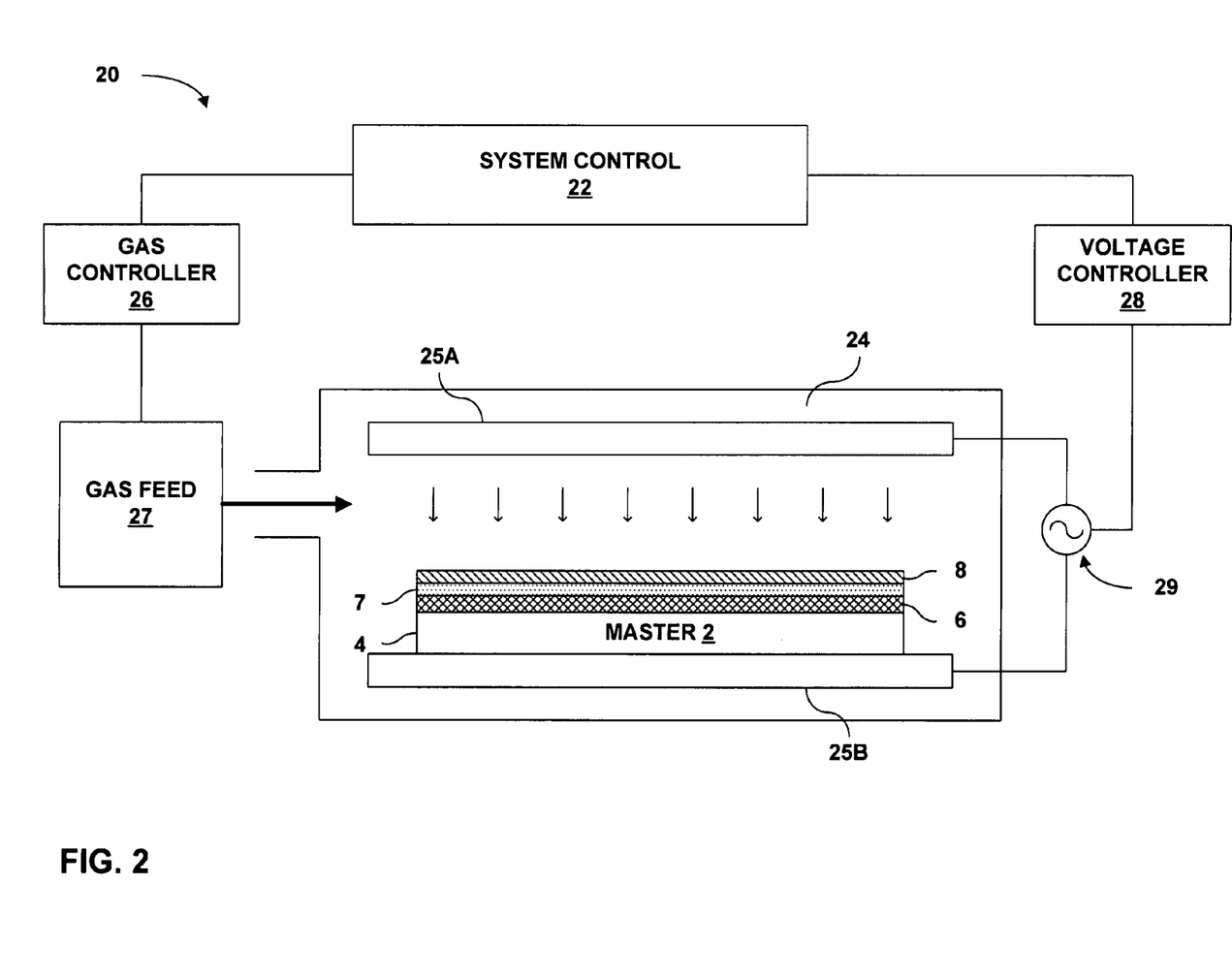
FIG. 2 is a block diagram illustrating an etching system that may be used to physically remove regions of a master, in accordance with embodiments of the invention.

FIG. 2 is a block diagram illustrating an etching system 20 that may be used to physically remove regions of master 2 (FIG. 1), in accordance with embodiments of the invention. In some cases, etching system 20 may also be used to develop the regions of master 2 photolithographically defined by illumination system 10. In the illustrated embodiment, etching system 20 comprises a plasma etching system capable of performing reactive ion etching (RIE). In other embodiments, any of a variety of etching systems may be used, including but not limited to sputtering systems, chemical etching systems, ion beam etching systems, and wet etching systems.

In general, etching system 20 includes a system control 22, such as a personal computer, workstation, or other computer system. System control 22, for example, may comprise one or more processors that execute software to provide user control over system 20. System control 22 provides commands to gas controller 26 and voltage controller 28 in response to user input. The commands sent from system control 12 to gas controller 26 and voltage controller 28 define the operation of system 20 during the etching process.

System 20 also includes a vacuum chamber 24 with a top electrode 25A and a bottom electrode 25B driven by a power source 29. Voltage controller 28 controls power source 29 to generate a desired driving voltage level. Power source 29 provides top electrode 25A with a positive charge and bottom electrode 25B with a negative charge. A gas feed 27 introduces a gas into vacuum chamber 24 where the gas breaks down and forms a plasma. In this case, the plasma includes both etchant atoms and ions.

Master 2 is carefully placed in system 20 on bottom electrode 25B. Master 2 again includes substrate 4 coated with the multi-layer structure that includes etch stop layer 6, etch layer 7, and photoresist layer 8. After photoresist layer 8 has been photolithographically exposed by optics 18 (FIG. 1) and developed by a developer process to define a PCM, master 2 may be placed in system 20 in order to etch physically exposed regions of etch layer 7 through the PCM. The current flowing from top electrode 25A to bottom electrode 25B causes positively-charged ions in the plasma to bombard master 2, which increases a reaction rate between the etchant atoms and etch layer 7. RIE can also increase anisotropy of the etch process to enhance sidewall angles of the features defined in etch layer 7. In some embodiments, system 20, or a similar etching system, may be used to develop photoresist layer 8 instead of using a developer solution.

Etch layer 7 may comprise a dielectric material, such as silicon dioxide ($SiO_2$). Etch stop layer 6 may comprise a relatively high index material used in anti-reflective coatings, e.g., tantalum oxide ($Ta_2O_5$). In any case, etch stop layer 6 and etch layer 7 comprise substantially different materials such that etch stop layer 6 is substantially unaffected by the etching process used to etch etch layer 7. In addition, etch stop layer 6 may define an index of refraction greater than an index of refraction defined by etch layer 7.

As described in greater detail below, master 2 includes features that can improve the mastering process. In particular, the multi-layer structure including photoresist layer 8, etch layer 7, and etch stop layer 6 is designed with layer thicknesses that generate substantially no reflectivity for at least one interface of the multi-layer structure. In some cases, a reflectivity as low as 4% may produce enough stray light to influence feature noise. Therefore, the at least one interface of the multi-layer structure may comprise a reflectivity of less then 4%, more preferably, less then 3%, more preferably less then 2%, and even more preferably less then 1%. The anti-reflectance of the multi-layer structure allows a master mask to be defined for etch layer 7 with minimal mastering noise such that fine feature resolution may be obtained on master 2. In addition, the thickness of etch stop layer 6 may be selected to reduce a surface roughness of master 2, which further reduces mastering noise. The invention described herein combines the reduced noise of the multi-layer structure with the fine feature definition of focused laser spot tip recording and the fine feature definition and processing advantages of RIE to create a master capable of providing increased storage density and/or improved feature definition.

Figure 3:
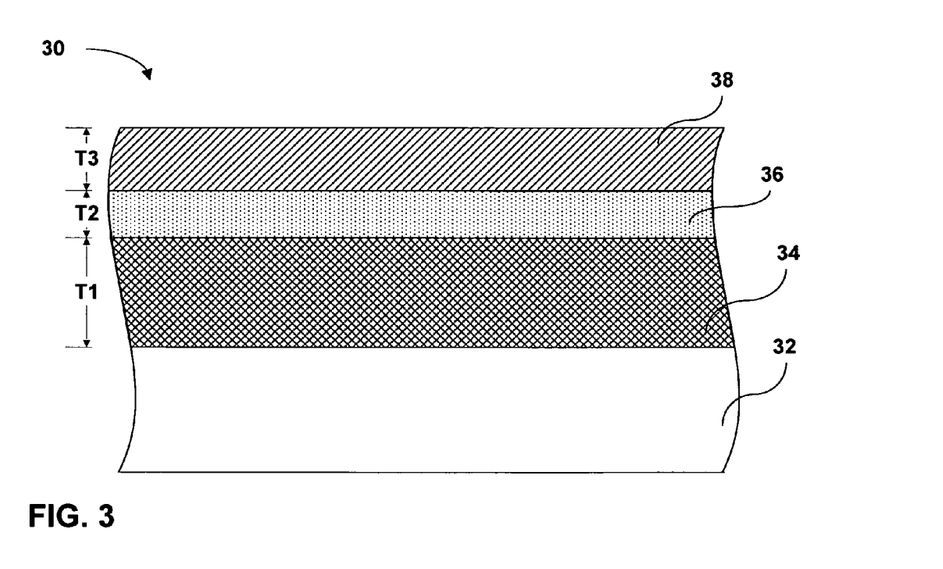
FIG. 3 is a schematic diagram illustrating a portion of a master comprising an anti-reflective multi-layer structure deposited adjacent a master substrate.

FIG. 3 is a schematic diagram illustrating a portion of a master 30 comprising an anti-reflective multi-layer structure deposited adjacent a master substrate 32. The multi-layer structure comprises an etch stop layer 34, an etch layer 36 formed over etch stop layer 34, and a photoresist layer 38 formed over etch layer 36. Etch stop layer 34 comprises a thickness T1, etch layer 36 comprises a thickness T2, and photoresist layer 38 comprises a thickness T3. The thicknesses, T1, T2, and T3 are selected to generate a reflectivity of approximately zero for at least one of the interfaces of the multi-layer structure. The anti-reflection multi-layer structure reduces noise during mastering, which enhances feature resolution on master 30.

Photoresist layer 38 is illuminated by an exposing light (not shown) to define a PCM for etch layer 36. In some embodiments, the exposing light comprises a focused laser spot capable of tip recording photoresist layer 38 to form a high resolution PCM. However, the exposing light incident on photoresist layer 38 may be reflected from the multi-layer structure, unless the multi-layer structure is specifically tuned as described herein. Reflected light can lead to stray light exposure of photoresist 38, which is generally undesirable. The unwanted exposed regions may then be developed as part of the PCM, which may cause imperfections to arise in the features of master 30.

In order to avoid stray light effects, the thicknesses of layers 34, 36, and 38 are tuned to substantially minimize reflection from the multi-layer structure. Thickness T2 associated with etch layer 36 may comprise a fixed thickness selected to be approximately equal to a final feature depth of master 30. For example, thickness T2 may be selected to be approximately 27 nm. Furthermore, etch layer 36 may comprise a material suitable for reactive ion etching (RIE), as illustrated in FIG. 2. For example, etch layer 36 may comprise a dielectric material, such as $SiO_2$, that defines an index of refraction of 1.48.

With thickness T2 defined, thickness T3 associated with photoresist layer 38 may be selected to help cause the desired anti-reflective characteristics of the multi-layer structure. Although, photoresist layer 38 typically comprises a substantially thin layer of photoresist material appropriate for mastering, thickness T3 may be altered relative to conventional photoresist thicknesses to achieve substantially no reflectivity for the at least one interface of the multi-layer structure. As an example, thickness T3 may be selected to be approximately 43 nm. Photoresist layer 38 may comprise a photoresist material that defines an index of refraction of 1.6.

Thickness T1 associated with etch stop layer 34 may also be selected to achieve the desired anti-reflective characteristics in the multi-layer structure. In the illustrated embodiment, etch stop layer 34 comprises a substantially thick etch stop. Thickness T1 may selected to be less than half a wavelength of the exposing light used to define the PCM in photoresist layer 38. As an example, the exposing light may comprise a wavelength of 351 rm. In that case, thickness T1 may be selected to be approximately 90 nm. Etch stop layer 34 may comprise a relatively high index material, such as tantalum oxide ($Ta_2O_5$), that defines an index of refraction of 2.3, which is greater than the index of refraction defined by etch layer 36.

In the illustrated embodiment, thickness T3 is defined relative to thicknesses T2 and T1 such that the reflectivity of the multi-layer structure approaches zero at an interface between photoresist layer 38 and surrounding air. For example, the reflectivity at the interface between photoresist layer 38 and the surrounding air may be less then 4%, more preferably less than 3%, more preferably less then 2%, and even more preferably less then 1%. In other embodiments, thicknesses T3, T2 and T1 may be defined such that the reflectivity of the multi-layer structure approaches zero at an interface between etch layer 36 and photoresist layer 38.

Figure 4:
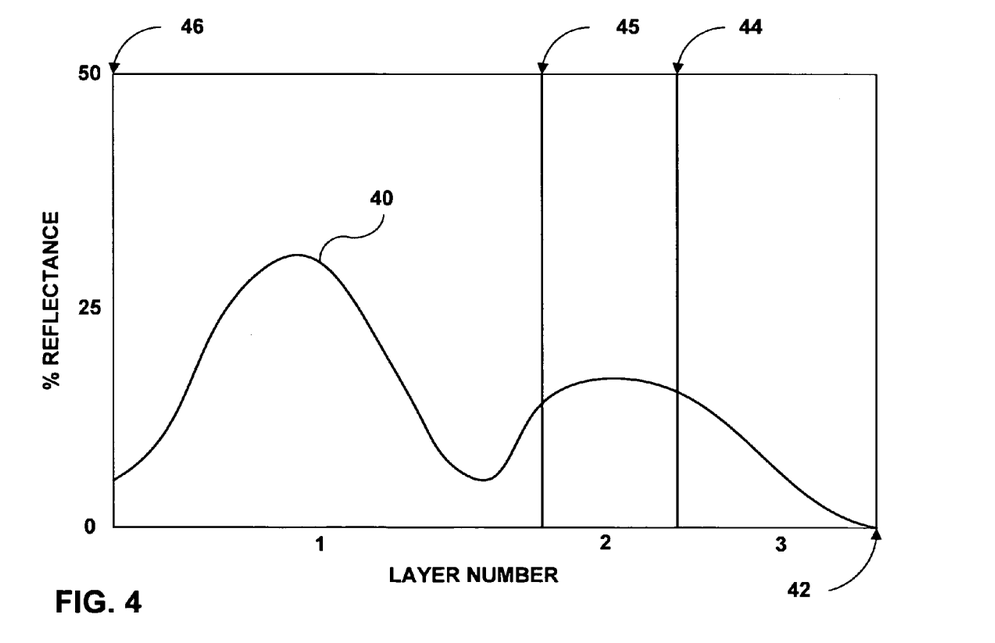
FIG. 4 is a plot illustrating percent reflectance vs. thickness of an exemplary medium having a multi-layer structure similar to that illustrated in FIG. 3.

FIG. 4 is a plot illustrating percent reflectance 40 vs. thickness of an exemplary medium having a multi-layer structure similar to that illustrated in FIG. 3. The medium plotted in FIG. 4 comprises a layer 34 of $Ta_2O_5$ having an index of refraction of approximately 2.3 and T1 of approximately 90 nm, a layer 36 of $SiO_2$ having an index of refraction of approximately 1.48 and T2 of approximately 27 nm, and a layer 38 of photoresist having an index of refraction of approximately 1.6 and T3 of approximately 38 nm. As shown in FIG. 4, percent reflectance 40 is approximately zero at an interface 42 between photoresist layer 38 (layer 3) and surrounding air. The exposing light had a wavelength of approximately 351 nm. The zero reflectance at interface 42 is due to the thicknesses of the layers selected as described above.

Thickness T1 is designated as the distance between interface 46 of substrate layer 32 and etch stop layer 34 and interface 45 of etch stop layer 34 and etch layer 36 (layer 2). Thickness T2 is designated as the distance between interface 45 and interface 44 of etch layer 36 and photoresist layer 38. Thickness T3 is designated as the distance between interface 44 and interface 42.

The percent reflectance values in FIG. 4 do not identify reflectance internal to the multi-layer structure. Instead, each point identifies the percent reflectance of a different multi-layer structure that does not include the material to the right of that data point. For example, if photoresist layer 38 was removed from the multi-layer structure in FIG. 3, the resulting reflectivity of the multi-layer structure would be the value given at interface 44 in FIG. 4, which is higher than the percent reflectance of the bare substrate in air given at interface 42. The percent reflectance of the multi-layer structure changes as thickness T3 of photoresist layer 38 increases. In the illustrated embodiment, the multi-layer structure reaches minimum reflectance when T3 is approximately equal to 38 nm.

Figure 5:
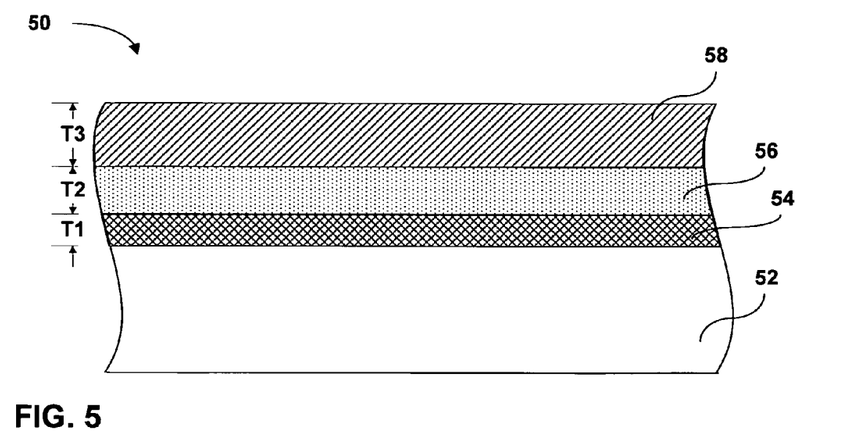
FIG. 5 is a schematic diagram illustrating a portion of another master comprising an anti-reflective, multi-layer structure deposited adjacent a master substrate.

FIG. 5 is a schematic diagram illustrating a portion of a master 50 comprising an anti-reflective multi-layer structure deposited adjacent a master substrate 52. The multi-layer structure comprises an etch stop layer 54, an etch layer 56 formed over etch stop layer 54, and a photoresist layer 58 formed over etch layer 56. Etch stop layer 54 comprises a thickness T1, etch layer 56 comprises a thickness T2, and photoresist layer 58 comprises a thickness T3. The thicknesses, T1, T2, and T3 are selected to generate substantially no reflectivity for the multi-layer structure. The anti-reflection, multi-layer structure reduces noise during mastering, which enhances feature resolution on master 50.

Photoresist layer 58 is illuminated by an exposing light (not shown) to define a PCM for etch layer 56. In some embodiments, the exposing light comprises a focused laser spot capable of tip recording photoresist layer 58 to form a high resolution PCM. However, at least a portion of the exposing light incident on photoresist layer 38 may be reflected from the multi-layer structure. The reflected light can lead to stray light exposure of photoresist 58. The unwanted exposed regions may then be developed as part of the PCM, which may cause imperfections to arise in the features of master 50.

In order to avoid stray light effects, the thicknesses of layers 54, 56, and 58 are tuned to substantially minimize reflection from the multi-layer structure. Thickness T2 associated with etch layer 56 may comprise a fixed thickness selected to be approximately equal to a final feature depth of master 50. For example, thickness T2 may be selected to be approximately 25 nm. Furthermore, etch layer 36 may comprise a material suitable for reactive ion etching (RIE), as illustrated in FIG. 2. For example, etch layer 56 may comprise a dielectric material, such as $SiO_2$, that defines an index of refraction of 1.48.

With thickness T2 defined, thickness T3 associated with photoresist layer 58 may be selected to help cause the desired anti-reflective characteristics of the multi-layer structure. Although, photoresist layer 58 typically comprises a substantially thin layer of photoresist material appropriate for mastering, thickness T3 may be slightly altered relative to conventional photoresist thicknesses to achieve zero reflectivity for the at least one interface of the multi-layer structure. As an example, thickness T3 may be selected to be approximately 43 nm. Photoresist layer 58 may comprise a photoresist material with an index of refraction of 1.6.

Thickness T1 associated with etch stop layer 54 may also be selected to achieve the desired anti-reflective characteristics in the multi-layer structure. In the illustrated embodiment, etch stop layer 54 comprises a substantially thin etch stop. Thickness T1 may be selected to be less than a quarter of a wavelength of the exposing light used to define the PCM in photoresist layer 58. As an example, the exposing light may comprise a wavelength of 351 nm. In that case, thickness T1 may be selected to be approximately 15 nm. Etch stop layer 54 may comprise a relatively high index material, such as tantalum oxide ($Ta_2O_5$), that defines an index of refraction of 2.3, which is greater than the index of refraction defined by etch layer 56.

A thinner etch stop layer 54 may reduce a surface roughness of master 50. Etch stop layer 54 comprises a material that may be grown or sputtered. Therefore, small imperfections in a thin layer of the material may become large imperfections in a thick layer of the material. Reducing the surface roughness of master 50 further reduces noise present in the mastering processes. In this way, features of master 50 may include enhanced resolution due to both the anti-reflection multi-layer structure and the reduced thickness etch stop layer. Specifically, the thinner 15 nm thickness of layer 54 relative to the 90 nm thickness of layer 34 (FIG. 3) can improve surface roughness of master 50 relative to master 30.

In the embodiment illustrated in FIG. 5, thickness T3 is defined such the reflectivity of the multi-layer structure approaches zero at an interface between photoresist layer 58 and surrounding air. For example, the reflectivity at the interface between photoresist layer 58 and the surrounding air may be less then 4%, more preferably less than 3%, more preferably less then 2%, and even more preferably less then 1%. In other embodiments, thickness T3 may be defined such that the reflectivity of the multi-layer structure approaches zero at an interface between etch layer 56 and photoresist layer 58.

Figure 6:
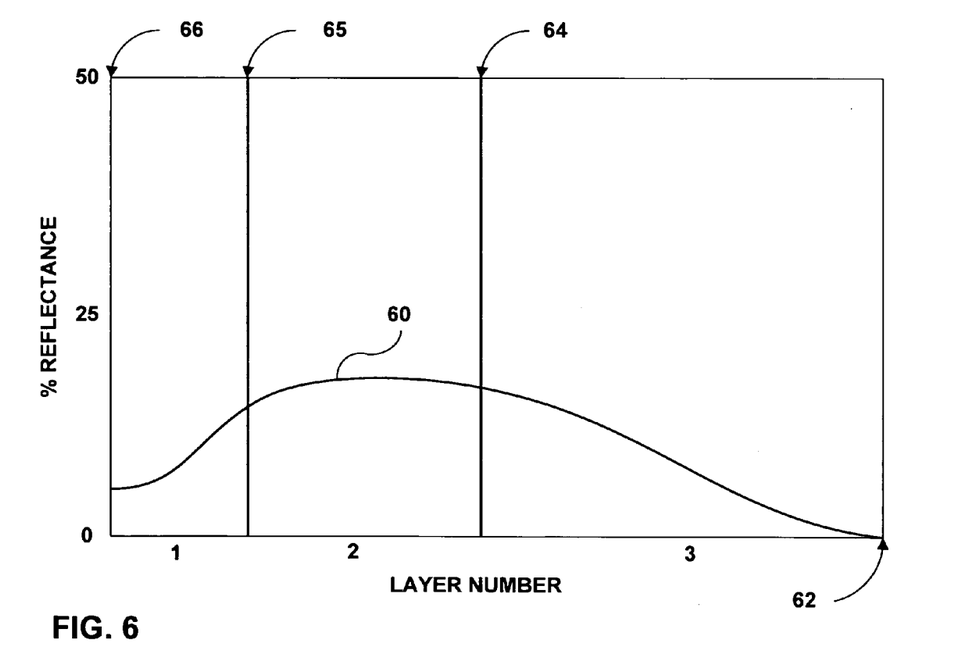
FIG. 6 is a plot illustrating percent reflectance vs. thickness of an exemplary medium having a multi-layer structure similar to that illustrated in FIG. 5.

FIG. 6 is a plot illustrating percent reflectance 60 vs. thickness of an exemplary medium having a multi-layer structure similar to that illustrated in FIG. 5. The medium plotted in FIG. 6 comprises a layer 54 of $Ta_2O_5$ having an index of refraction of approximately 2.3 and T1 of approximately 15 nm, a layer 56 of $SiO_2$ having an index of refraction of approximately 1.48 and T2 of approximately 25 nm, and a layer 38 of photoresist having an index of refraction of approximately 1.6 and T3 of approximately 43 nm. As shown in FIG. 6, percent reflectance 60 is approximately zero at an interface 62 between photoresist layer 58 (layer 3) and surrounding air. The exposing light had a wavelength of approximately 351 nm. The zero reflectance at interface 62 is due to the thicknesses of the layers selected as described above.

Thickness T1 is designated as the distance between interface 66 of substrate layer 52 and etch stop layer 54 and interface 65. Thickness T2 is designated as the distance between interface 65 and interface 64 of etch layer 56 and photoresist layer 58. Thickness T3 is designated as the distance between interface 64 and interface 62.

FIGS. 7A-7D are schematic diagrams illustrating a mastering technique for a master 90. Master 90 includes a substrate layer 92 and a multi-layer structure deposited adjacent substrate layer 92. The multi-layer structure includes an etch stop layer 94, an etch layer 95 formed over etch stop layer 94, and a photoresist layer 96 formed over etch layer 95. A thickness of each of the layers is selected to generate substantially no reflectivity for at least one interface of the multi-layer structure.

Photoresist layer 96 may comprise a deep UV, a mid-UV or a violet photoresist material. The deep-UV photoresist material may comprise a material primarily sensitive to wavelengths of light shorter than 300 nm, the mid-UV photoresist material may comprise a material primarily sensitive to wavelengths of light between approximately 400 nm and 300 nm, and the violet photoresist material may comprise a material primarily sensitive to wavelengths of light between approximately 460 nm and 400 nm. Etch layer 95 may comprise a dielectric material, such as silicon dioxide ($SiO_2$). Etch stop layer 94 may comprise a relatively high index material, e.g., tantalum oxide ($Ta_2O_5$). In addition, etch stop layer 94 may define an index of refraction greater than an index of refraction defined by etch layer 95.

The illustrated technique includes defining a portable conformable mask (PCM) for etch layer 95 with photoresist layer 96 by developing a photolithographically defined region 104 of photoresist layer 96. The technique also includes defining a feature of master 90 by etching etch layer 95 through the PCM defined by photoresist layer 96.

Figure 7A:
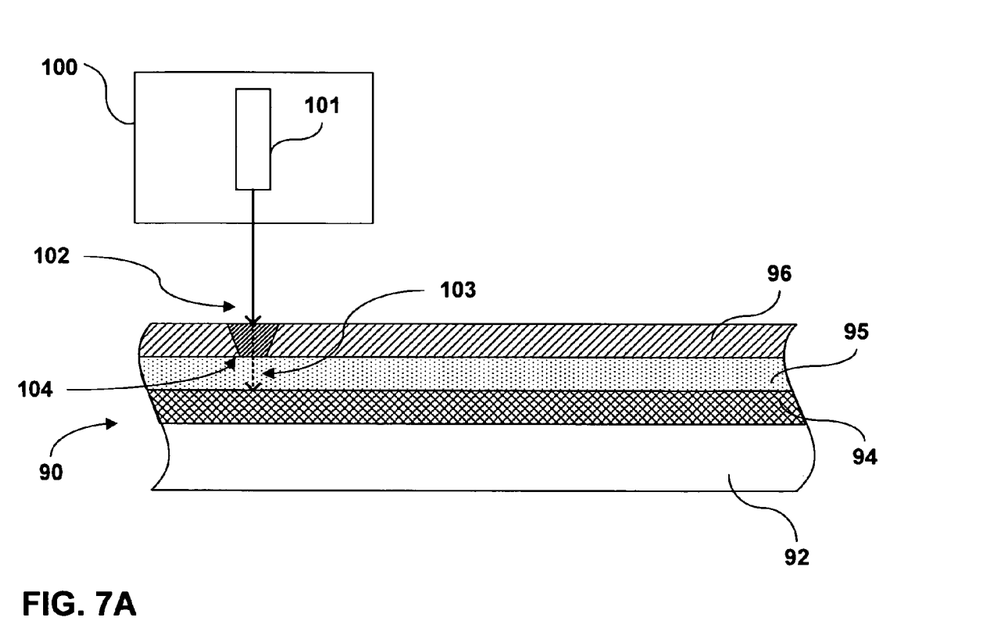
FIGS. 7A-7D are schematic diagrams illustrating a mastering technique for a master.

FIG. 7A illustrates a portion of master 90 being illuminated by optics 100, which may operate substantially similar to optics 18 in FIG. 1. Optics 100 includes a laser 101 that produces exposing light used to create a precisely focused laser spot 102. Optics 100 illuminates photoresist layer 96 of master 90 with focused laser spot 102. Illuminating photoresist layer 96 with laser spot 102 photolithographically defines a region 104 of photoresist layer 96. Photolithographically defined region 104 may correspond to a feature of master 90. As described herein, a multi-layer structure including layers 94, 95 and 96 is defined to minimize reflection that can cause unwanted exposure of photoresist layer 96 during this photolithography process.

As photoresist layer 96 is illuminated, a portion 103 of the exposing light may be transmitted through photoresist layer 96 to etch layer 95. The thickness of etch layer 95 may comprise a fixed thickness approximately equal to a final feature depth of master 90. Furthermore, etch stop layer 94 may comprise a relatively high index material. A thickness associated with etch stop layer 94 and a thickness associated with photoresist layer 96 may be defined to minimize reflectivity from either an interface between photoresist layer 96 and surrounding air or an interface between etch layer 95 and photoresist layer 96. Therefore, substantially none of the exposing light incident on photoresist layer 96 is reflected from the multi-layer structure. In this way, mastering noise may be reduced by substantially eliminating reflected light that can cause stray light exposure of photoresist layer 96.

Optics 100 may then be translated in either a continuous manner for a spiral pattern or in discrete steps relative to master 90 so that during a subsequent pass, focused laser spot 102 defines a different region of photoresist layer 96. In this way, a plurality of features of master 90 may be photolithographically defined in photoresist layer 96.

Figure 7B:
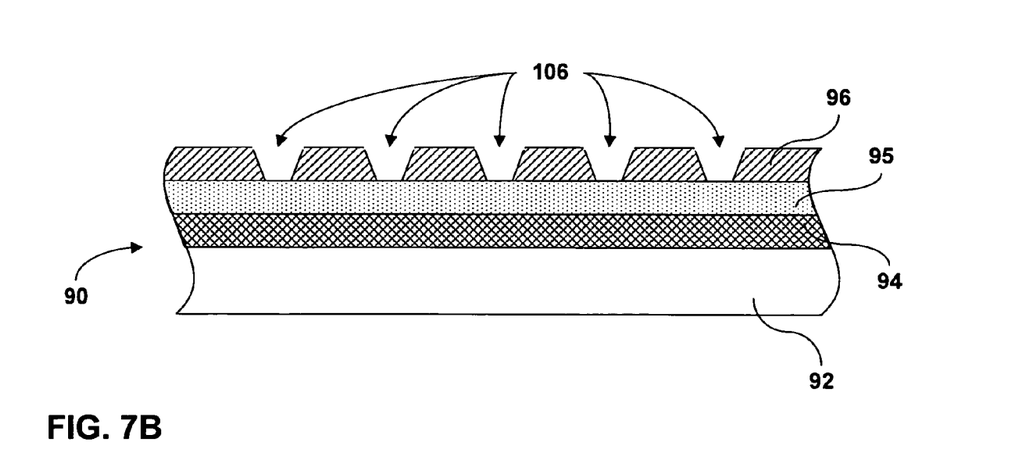

FIG. 7B illustrates the portion of master 90 with photoresist layer 96 developed. A developer solution may be applied to photoresist layer 96 to remove photolithographically defined regions 104 from master 90. In other embodiments, an etching system substantially similar to etching system 20 of FIG. 2 may be used to develop photoresist layer 96. Developing photoresist layer 96 physically defines regions 106 in photoresist layer 96.

Figure 7C:
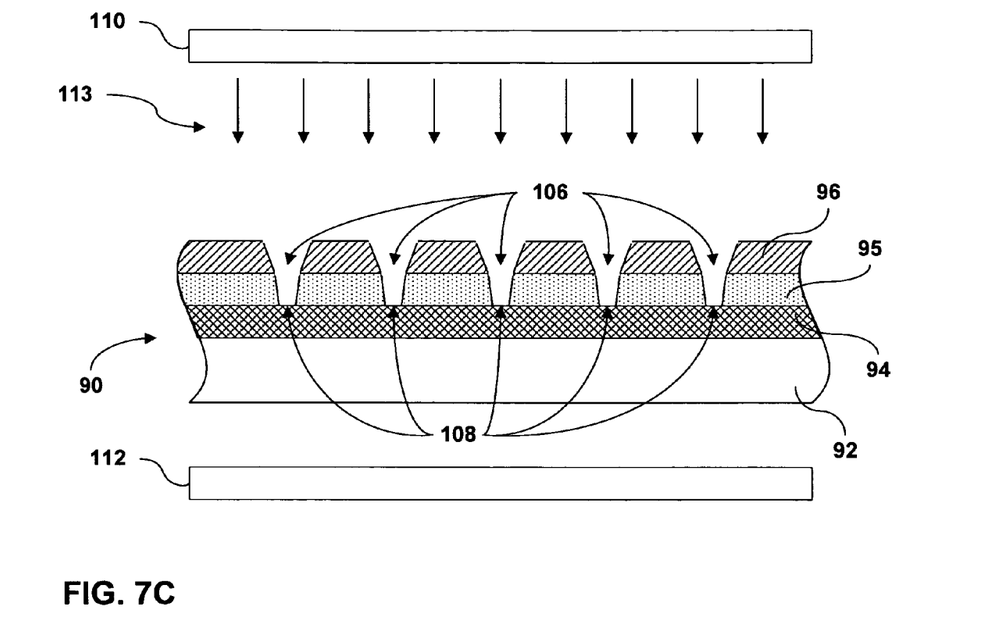

FIG. 7C illustrates the portion of master 90 with etch layer 95 being etched. The etching process may occur in a reactive ion etching (RIE) system, which may operate substantially similar to etching system 20 from FIG. 2. In the illustrated embodiment, the etching system includes a top electrode 110 that may comprise a positive charge and a bottom electrode 112 that may comprise a negative charge. A current flowing from top electrode 110 to bottom electrode 112 causes ions 113 to bombard a surface of master 90, which increases a reaction rate of etchant atoms with etch layer 95.

Etching etch layer 95 removes material through the PCM defined by photoresist layer 96 to physically define regions 108 in etch layer 95. Etch stop layer 94 and etch layer 95 comprise substantially different materials such that etch stop layer 94 remains substantially unaffected during the etching process of etch layer 95. Physically defined regions 108 correspond to features of master 90. In some embodiments, regions 108 may correspond to tracks of mater 90.

Figure 7D:
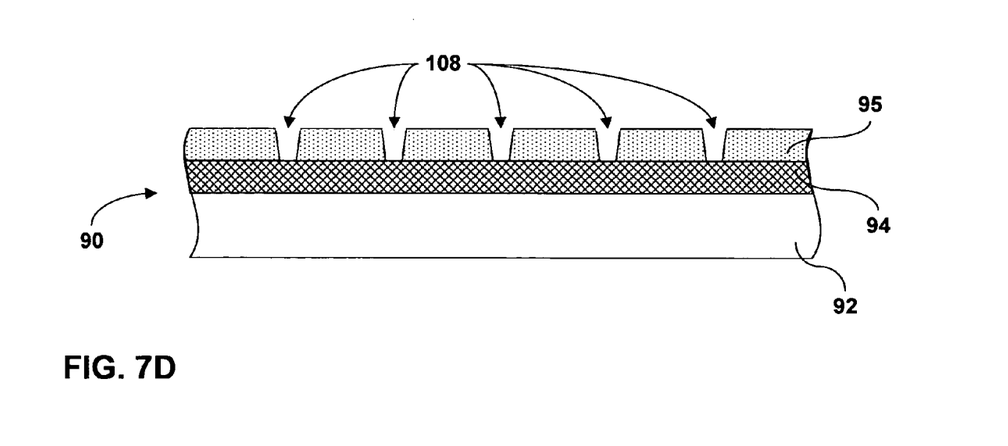

FIG. 7D illustrates the portion of master 90 with photoresist layer 96 removed. In the illustrated embodiment, master 90 is defined by substrate layer 92, etch stop layer 94, and etch layer 95. Regions 108 in etch layer 95 define high resolution features of master 90. The invention described herein combines the reduced noise of the anti-reflection multi-layer structure and the substantially thin etch stop layer 94 with the fine feature definition of focused laser spot tip recording and the fine feature definition and processing advantages of RIE to create master 90 capable of providing increased storage density and improved feature definition. In this case, thickness of etch layer 95 ultimately defines the feature depths in master 90 and subsequent stampers and replica discs that may be created from master 90.

In other embodiments, photoresist layer 96 may not be removed from master 90 after defining features 108 in etch layer 95. Master 90 may be ultimately defined by master substrate 92 and any number of the layers formed over the master substrate. In other words, after photolithography and etching, all of the layers may remain on master 90, or alternatively one or more of the layers may be removed, with only the remaining layers defining the master features.

Various embodiments of the invention have been described. For example, a data storage disk mastering technique has been described that includes coating a substrate layer of a master with a multi-layer structure comprising an etch stop layer, an etch layer, and a photoresist layer. A thickness of each of the layers is selected to generate substantially no reflectivity for at least one interface of the multi-layer structure to reduce stray light effects. In addition, the etch stop layer may be a thin etch stop layer to reduce surface roughness of the master. The photoresist layer defines a portable conformable mask (PCM) for the etch layer. The photolithography tip recording process can be performed to define very small features in a PCM. The etch layer is etched through the high resolution PCM to define features of the master. Reducing stray light effects and surface roughness enhance feature resolution of the master.

Nevertheless various modifications can be made to the techniques described herein without departing from the spirit and scope of the invention. For example, the multi-layer structure is typically described as being designed to minimize reflectivity at an interface between the photoresist layer and surrounding air. However, the multi-layer structure may be designed to minimize reflectivity at an interface between the etch layer and the photoresist layer, or possibly another interface. These and other embodiments are within the scope of the following claims.

The invention claimed is:

1. A data storage disk master comprising:
A disk-shaped glass substrate layer; and
a multi-layer structure deposited adjacent the disk-shaped glass substrate layer, the multi-layer structure including an etch-stop layer of a first thickness, an etch layer of a second thickness, and a photoresist layer of a third thickness, wherein the second thickness associated with the etch layer comprises a fixed thickness approximately equal to a final feature depth of the master, and wherein the first thickness and the third thickness are chosen such that the first, second, and third thicknesses generate reflectivity less than approximately four percent of the incident light for at least one interface of the photoresist layer of the multi-layer structure wherein the at least one interface is one or both of an interface of the photoresist layer and the surrounding air or an interface of the etch layer and the photoresist layer and
wherein the photoresist layer defines a contact mask and the etch layer is etched through the contact mask to define a feature of the master in the etch layer.

2. The master of claim 1, wherein the etch layer defines a first index of refraction and the etch stop layer defines a second index of refraction greater than the first index of refraction.

3. The master of claim 1, wherein the photoresist layer has been illuminated by an exposing light and developed to define the contact mask.

4. The master of claim 3, wherein the first thickness associated with the etch stop layer is less than a quarter of a wavelength of the exposing light.

5. The master of claim 3, wherein the first thickness associated with the etch stop layer is less than a half of a wavelength of the exposing light.

6. The master of claim 1, wherein the etch stop layer and the etch layer comprise substantially different materials such that the etch stop layer is substantially unaffected by an etching process used to etch the etch layer.

7. The master of claim 1, wherein the etch stop layer comprises a relatively high index material used in and-reflective coatings.

8. The master of claim 7, wherein the relatively high index material comprises tantalum oxide ($Ta_2O_5$).

9. The master of claim 1, wherein the etch layer comprises silicon oxide ($SiO_2$).

10. A method of creating a storage disk master comprising:
Depositing a multi-layer structure adjacent a disk-shaped glass substrate layer, the multi-layer structure including an etch-stop layer of a first thickness, an etch layer of a second thickness formed over the etch stop layer, and a photoresist layer of a third thickness formed over the etch layer,
prior to depositing the multi-layer structure, selecting the second thickness associated with the etch layer to comprise a fixed thickness approximately equal to a final feature depth of the master and choosing the first thickness and the third thickness such that the first, second , and third thicknesses generate reflectivity less than approximately four percent of incident light for at least on interface of the photoresist layer of the multi-layer structure wherein the at least one interface is one or both of an interface of the photoresist and the surrounding air or an interface of the photoresist and the etch layer;

defining a contact mask with the photoresist layer; and etching the etch layer through the contact mask to define features in the etch layer.

11. The method of claim 10, further comprising illuminating the photoresist layer with an exposing light and developing the photoresist layer to define the contact mask.

12. The method of claim 10, further comprising substantially minimizing the first thickness associated with the etch stop layer to reduce surface roughness of the master disk.

13. The method of claim 10, wherein the etch layer defines a first index of refraction and the etch stop layer defines a second index of refraction greater than the first index of refraction.

14. The method of claim 10, wherein the etch stop layer comprises a relatively high index material used in anti-reflective coatings.

* * * * *